United States Patent [19]
Roscizewski

[11] Patent Number: 5,230,142
[45] Date of Patent: Jul. 27, 1993

[54] OPERATING AND TORQUE TOOL

[75] Inventor: Paul M. Roscizewski, Eagle, Wis.

[73] Assignee: Cooper Power Systems, Inc., Coraopolis, Pa.

[21] Appl. No.: 854,190

[22] Filed: Mar. 20, 1992

[51] Int. Cl.[5] .................................. H01R 43/00
[52] U.S. Cl. ........................... 29/758; 29/764; 81/53.1; 294/19.1; 464/36
[58] Field of Search .............. 29/758, 764; 464/35, 464/36, 37–39; 294/19.1; 81/53.1

[56] References Cited
U.S. PATENT DOCUMENTS
3,702,546  11/1972  Schnepel ........................ 64/29

OTHER PUBLICATIONS
RTE Components, Section 1542-1, p. 1, "600 A, 15 kV Class Loadbreak Reducing Tap Plug and Bushing Adapter", Jun. 1987.

*Primary Examiner*—Carl E. Hall
*Attorney, Agent, or Firm*—David A. Rose; Marcella D. Watkins

[57] ABSTRACT

A tool for connecting or disconnecting a loadbreak reducing tap plug, comprising a shaft having a first end adapted for engagement with an end of the loadbreak reducing tap plug and a second end connected to a torque release means, an insulating boot mounted on the shaft, the torque release means having first and second components which release at a predetermined torque, the second shaft engaging the second component, a handle affixed to the first component of the torque release means, such that when a torque that is less than the predetermined torque is applied to the handle, the torque is transmitted through the components to the shaft, whereby the torque is transmitted to the element of the loadbreak reducing tap plug, while a torque that is greater than the predetermined torque is not transmitted through the components, but causes the first component to rotate relative to the second component.

11 Claims, 5 Drawing Sheets

OPERATING AND TORQUE TOOL

TECHNICAL FIELD OF THE INVENTION

The present invention relates to high voltage electrical connections. More particularly, the invention discloses a novel tool for installing or removing a separable connector assembly from a deadbreak connector or the like. Still more particularly, the invention is a tool which has both torque set and control capability and alignment and coupling capability, for use with a loadbreak reducing tap plug.

BACKGROUND OF THE INVENTION

High voltage electrical connections are well known in the art. When it is desired to convert a standard 600 amp (A) deadbreak interface to a standard 200 A loadbreak interface, a loadbreak reducing tap plug (LRTP), such as the 15 kV class loadbreak reducing tap plug No. 2637825B04M manufactured by RTE components, Pewaukee, Wisc., may be used.

A typical LRTP includes an elongate electrically insulated member with a conducting core. One end of the LRTP is adapted for snap-on electrical connection to a 200 A separable connector component. At its other end, the LRTP has a threaded, rotatable element sized for engagement with mating threads on a deadbreak bushing or the like. Typically, the rotatable element is a floating bolt having male threads and rotatably connected to and extending from the insulated body of the LRTP. Alternatively, the LRTP may have a floating nut, having female threads and rotatably connected to and housed within the insulated body of the LRTP.

When connecting an LRTP at its threaded end, it is necessary to insert at its free end a tool that extends the length of the LRTP, in order to rotate and advance the rotatable element at the threaded end. Alignment of the mating parts requires that the LRTP be stabilized while the connection is made. Similarly, when disconnecting the separable connector assembly from a deadbreak bushing or the like, it is desirable to stabilize the LRTP and separable connector while the floating bolt or nut is disengaged and to be able to pull the LRTP and separable connector out of the connection upon disengagement.

Typically, the necessary functions are performed by an operating tool which includes a shaft with its free end adapted to engage a hexagonal socket in the rotatable element. The other end of the shaft passes through a cap, or boot, and is affixed to an eye, so that the shaft may be rotated by a standard hot stick inserted into the eye, while the boot grasps and steadies the tool.

Furthermore, to ensure proper electrical connection, there is typically a specific torque to which the connection must be tightened. Tools for applying a preset amount of torque are known in the art. Examples include the torque limiting adapter that is the subject of U.S. Pat. No. 3,702,546 and the Perf-a-Torq tool manufactured by The X-4 Corporation of N. Billerica, Mass.

An separable connector assembly installation usually requires two steps: initial alignment and partial tightening of the connection using an operating tool, and final tightening of the connection using a torque tool. Stabilization is also desired when removing the separable connector, but torque setting capability is no longer necessary.

The present invention is a tool adapted for engagement of the rotatable element and further adapted to provide a mechanism whereby torque application can be limited. The present invention eliminates the need for multiple tools in the separable connector installation and removal processes and overcomes the deficiencies of the prior art.

SUMMARY OF THE INVENTION

According to the present invention, the operating tool includes a stabilization means and a torque release means, which enables the tool to function as both an operating tool and a torque tool. The torque release means is adapted to fit between the handle and shaft of the operating tool in a manner which allows a rotating force to be transmitted from the handle to the shaft at the operating end of the tool. The torque release means operates to disengage the force transmitting member when a predetermined amount of torque has been applied.

Other objects and advantages of the invention will appear from the following description.

BRIEF DESCRIPTION OF THE DRAWINGS

For a detailed description of a preferred embodiment of the invention, reference will now be made to the accompanying drawings wherein.

DETAILED DESCRIPTION OF THE PREFERRED EMBODIMENT

Figure 1:
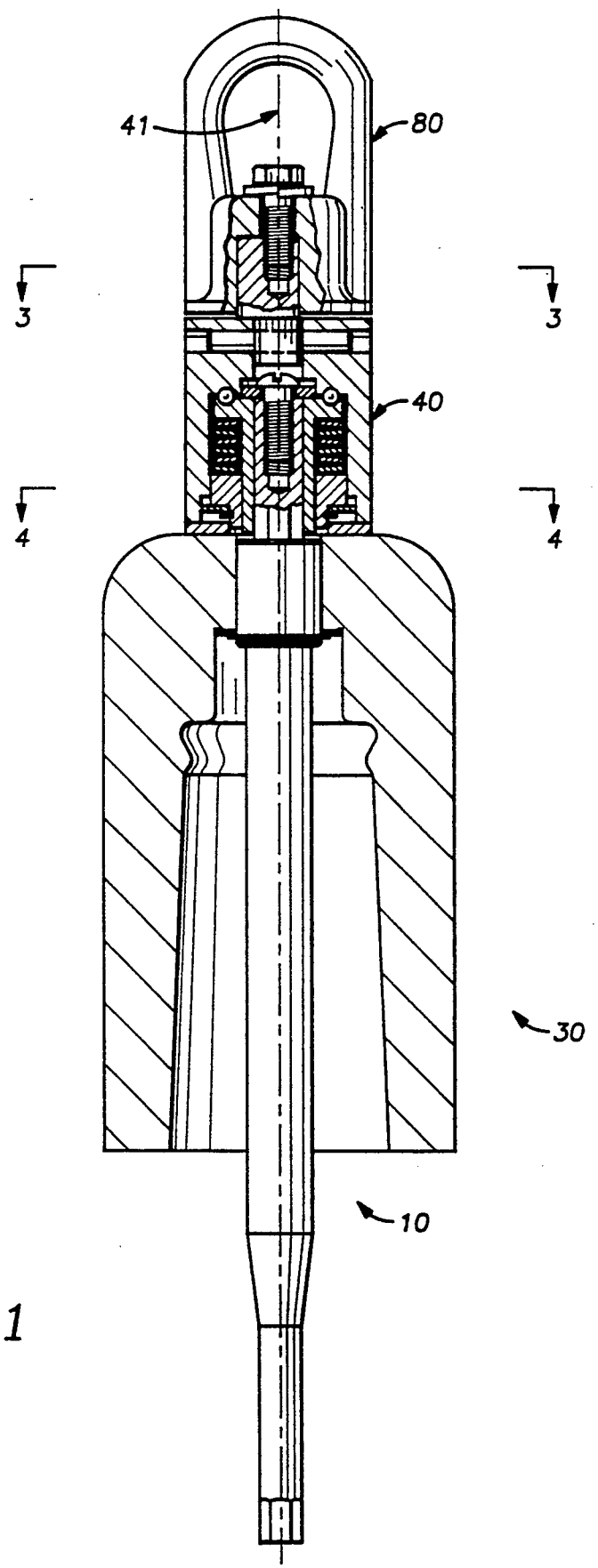
FIG. 1 is a cross-sectional side view of a tool according to the present invention.

Referring initially to FIG. 1, the tool of the present invention includes a torque release means 40 disposed between a shaft 10 and a handle 80. A boot 30 is seated on shaft 10 adjacent to the torque release means 40. Unless otherwise stated, all elements of the tool have a common axis 41.

Figure 2:
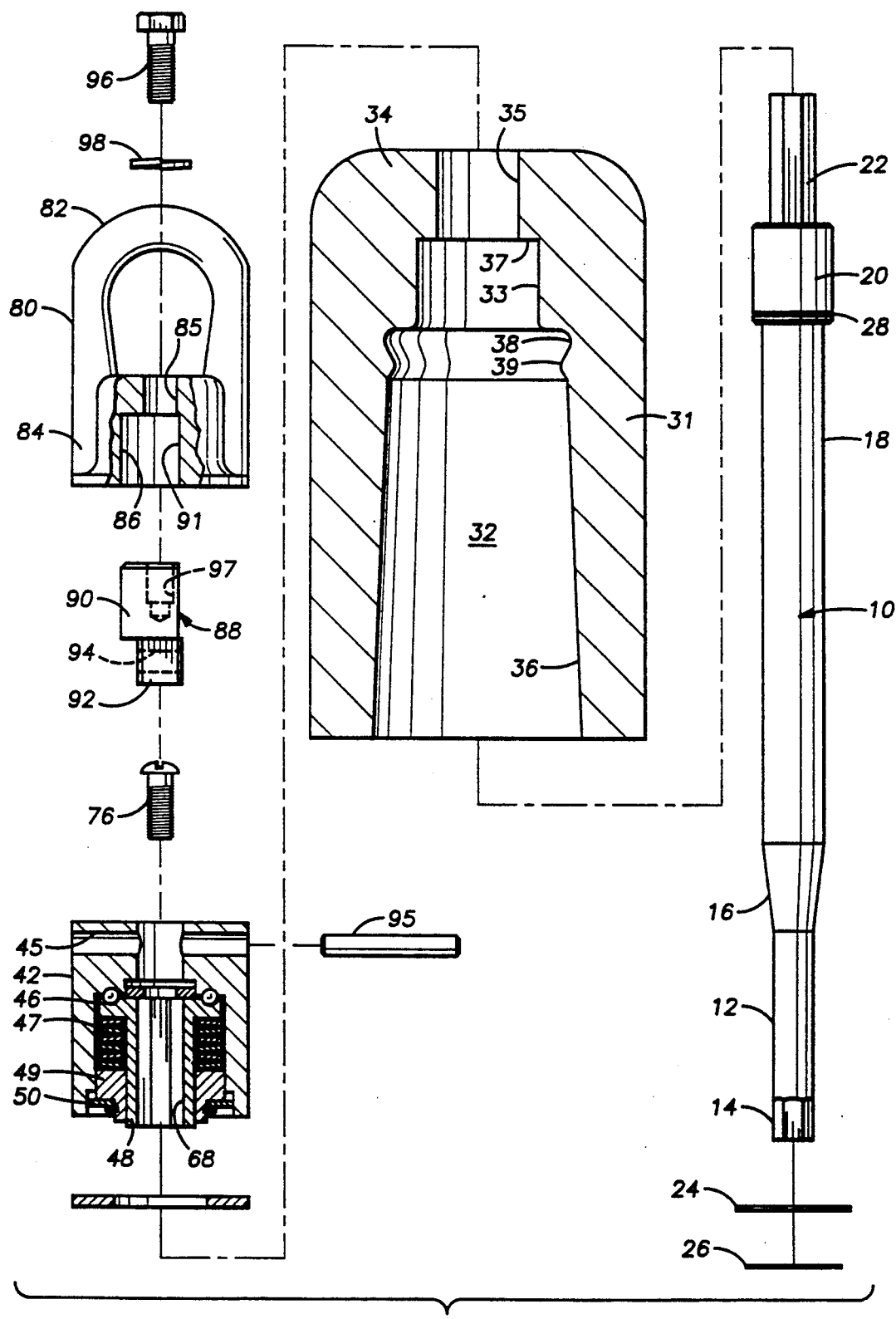
FIG. 2 is an exploded view of the tool of FIG. 1.

Referring now to FIG. 2, shaft 10 has a reduced diameter portion 12 that terminates in a hexagonal shaft 14, a tapered transition section 16, a mid-section 18 and an enlarged diameter section 20 which includes an annular snap-ring groove 28. Extending from enlarged diameter section 20 is a second hexagonal shaft 22. Second hexagonal shaft 22 includes a coaxial threaded bore 23 therein best shown in FIG. 5.

Boot 30 has a generally cup-shaped body 31 forming cavity 32 and a closed end 34, and an axial opening 35 through closed end 34. Cavity 32 is adapted to accommodate an LRTP (not shown), and includes an inner conical surface 36 tapered for surrounding engagement with the outer surface of the LRTP. Cavity 32 further includes an annular shoulder 37 formed by a counterbore 33, a groove 38, and an annular locking ridge 39.

Axial opening 35 of boot 30 is disposed around and seated on enlarged diameter section 20 of shaft 10, and is held in place by a washer 24 and snap-ring 26, which is received by snap-ring groove 28. Second hexagonal shaft 22 of shaft 10 has a sufficient longitudinal length such that it extends through opening 35 and beyond closed end 34 of boot 30. When shaft 10 is inserted into an LRTP, the inner conical surface 36 of boot 30 is in surrounding engagement with one end of the LRTP, groove 38 and locking ridge 39 snap onto a corresponding ridge and groove (not shown) on the LRTP, and shaft 14 is releaseably received and engages the rotatable element at the opposite end of the LRTP. This rigid connection of the boot 30 to the LRTP enables the use of the boot 30 to support and guide the LRTP and separable connector assembly into or out of another electrical component, such as a "T-Op" connector of the type manufactured by RTE Components, Pewaukee, Wisc., Part No. 2638682B.

Torque release means 40 includes two coaxial, relatively rotatable elements, namely a cylindrical housing 42 that includes a chamber 46, and an internal torque transmitting member 48 mounted within chamber 46. Three pairs of oppositely disposed belleville washers 47, annular load cap 49, and washer 50 are disposed about force transmitting member 48 within chamber 46.

Figure 5:
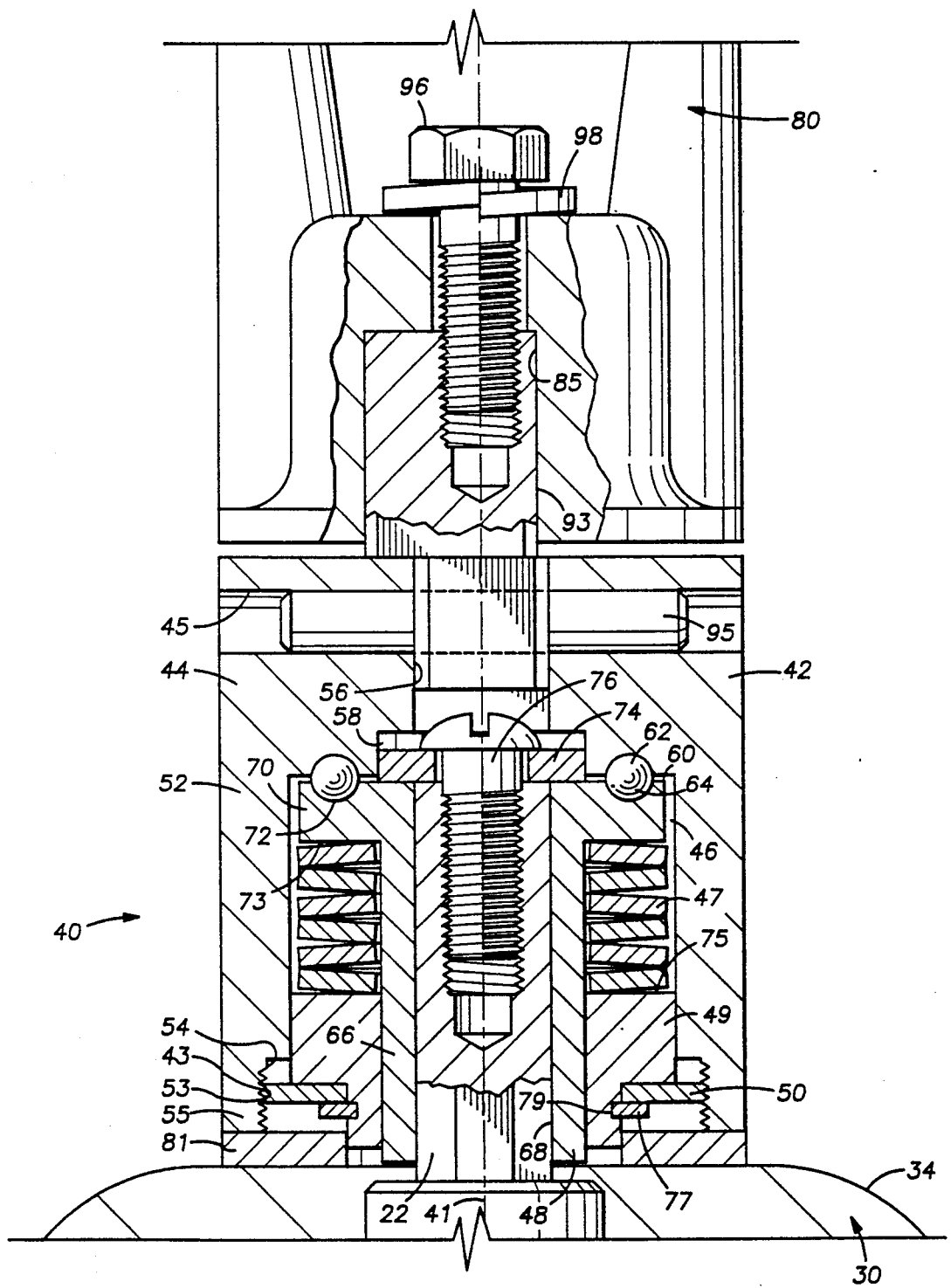
FIG. 5 is an enlarged view of the torque release means connected to the shaft and handle of the tool in FIG. 1.

Referring now to FIG. 2 and 5, and particularly FIG. 5, housing 42 has a circular cross-section with a cylindrical side wall 52 closed at one end by end wall 44, on which transmitting member 48 bears. Chamber 46 has a counterbore 54 forming an annular lip 55 which receives washer 50. Washer 50 includes threads 53 around its outer circumference, which threadingly engage threads 43 as the inner circumference of counterbore 54 of housing 42. End wall 44 has a coaxial opening 56, which is non-circular, and is preferably square. Opening 56 extends through end wall 44 to chamber 46, and its inner end is enlarged diametrically to provide a shallow recess 58. End wall 44 also includes a transverse bore 45 therethrough, which is perpendicular to axis 41.

The interior side 60 of end wall 44 contains a plurality of recesses 62 arranged radially in a circle about axis 41 and adjacent to side wall 52, recesses 62 being hemispherical in configuration for receiving ball bearings 64. In a preferred embodiment, there are twelve recesses 62 spaced regularly about axis 41.

Internal torque transmitting member 48 comprises a cylindrical body 66 which includes a coaxial hexagonal bore 68 therethrough, and an annular flange 70 extending radially about one terminal end. Hexagonal bore 68 is sized to receive the second end of second hexagonal shaft 22.

Annular flange 70 is sized to be rotatably received within chamber 46 and has sufficient clearance to turn freely therein. Flange 70 also includes a plurality of mating hemispherical recesses 72 corresponding in number to recesses 62 and azimuthally spaced about the axis 41 of the flange 70. Recesses 72 are located at the same radial distance from axis 41 as are recesses 62. Belleville washers 47 are disposed around cylindrical body 66 between the back face 73 of flange 70 and one end 75 of annular load cap 49. Belleville washers 47 bias transmitting member 48 against the inner side 60 of end wall 44. Load cap 49 is held in place by washer 50 and another snap-ring 77 which is received in a snap-ring groove 79 around load cap 49.

Figure 4:
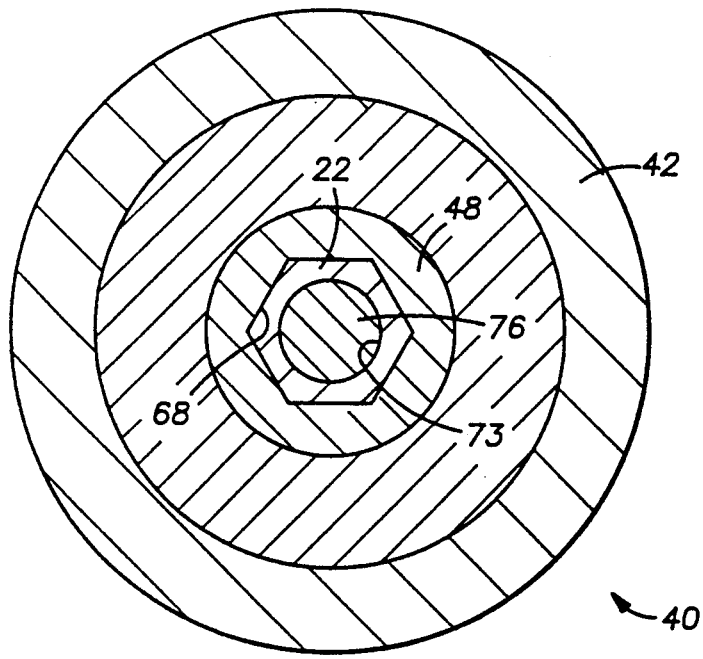
FIG. 4 is a cross-sectional end view of the tool taken along plane 4—4 in FIG. 1.

A washer 74 is housed within shallow recess 58 in end wall 44 and held in position by bolt 76 passing through washer 74 and threaded into threaded bore 23 of second hexagonal shaft 22, as shown in FIGS. 2 and 4. Bolt 76 serves to retain torque release means 40 on shaft 10. When torque transmitting member 48 and shaft 10 are so connected, lip 55 of housing 42 abuts washer 81 disposed between housing 42 and boot 30 to prevent load cap 49 from contacting end 34 of boot 30.

Figure 3:
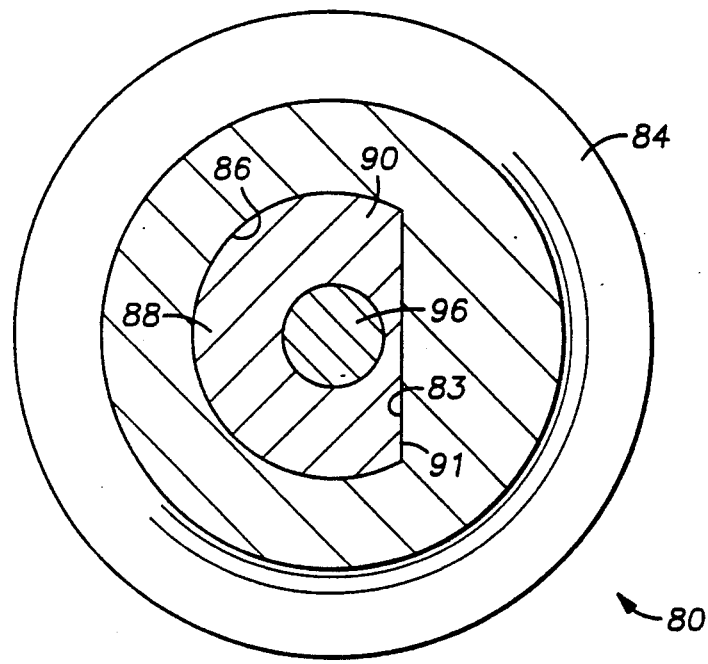
FIG. 3 is a cross-sectional end view of the tool taken along plane 3—3 in FIG. 1.

Referring now to FIGS. 2 and 3, handle 80 includes an eye portion 82 and a base 84. Base 84 includes a coaxial bore 85 therethrough and an eccentric opening 86. A lug 88 is disposed within eccentric opening 86. Lug 88 has an eccentric portion 90, which includes planar face 91, and a square portion 92, which extends from base 84 upon lug 88 being attached to base 84. A bolt 96 passes through bore 85 and is threaded onto threads 97 in eccentric lug portion 90 to connect lug 88. Lockwasher 98 retains bolt 96 in its desired position. Planar face 91 engages a corresponding planar face 83 within opening 86 in base 84, to facilitate the transmittal of torque from base 84 to lug 88. Square portion 92 includes a transverse bore 94 therethrough perpendicular to axis 41. Square portion 92 is matingly received within opening 56 of housing 42 and is held in place by a pin 95 passing through aligned bores 45 and 94.

Figure 1A:
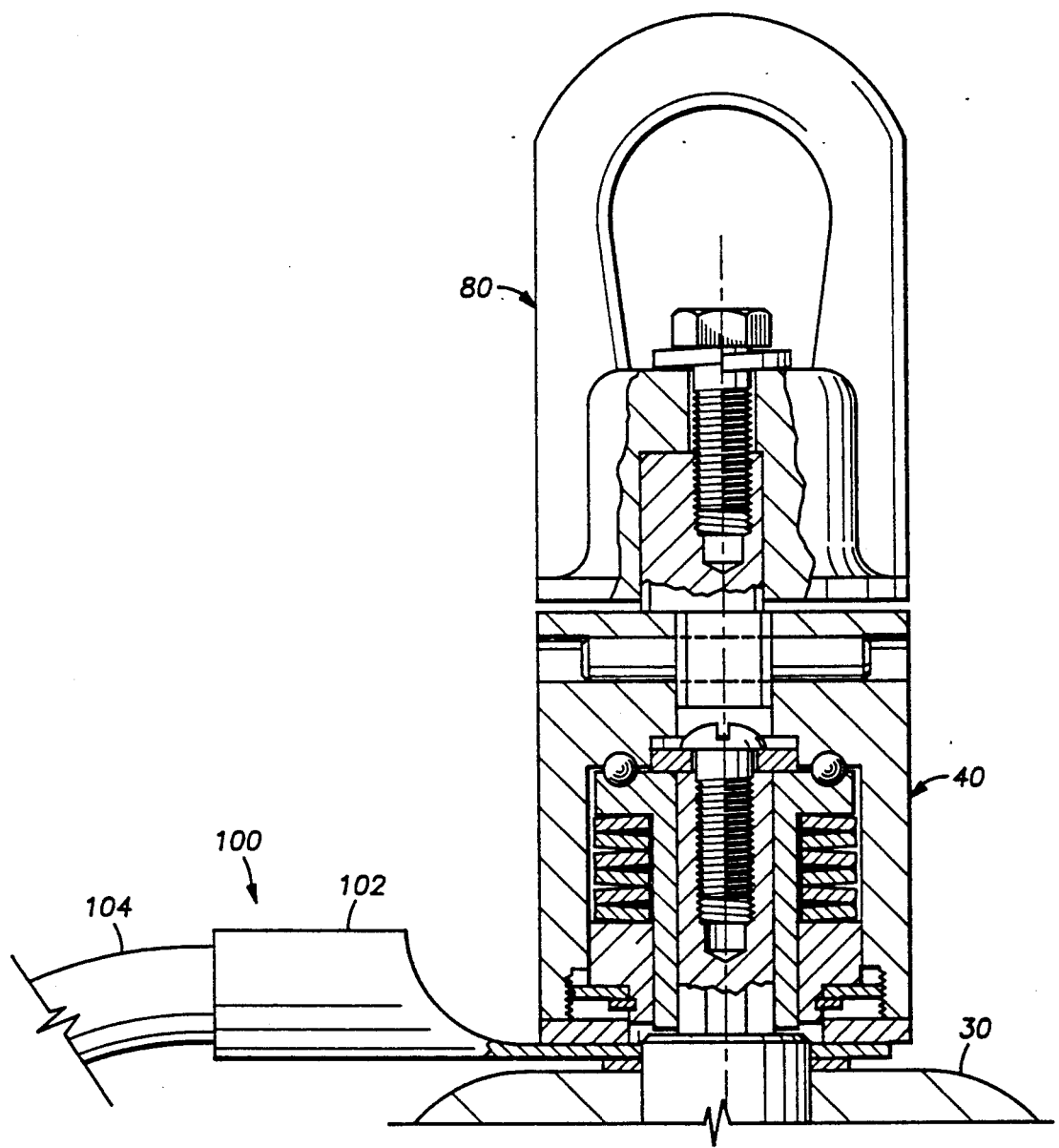
FIG. 1A is a cross-sectional side view of the tool of FIG. 1, showing the addition of a grounding cable.

Optionally, the tool may include a ground 100, shown in FIG. 1A, electrically connected to housing 42 at one end and at its other end to a ground, to provide a static ground and ensure that no current is conducted through the tool to the operator. For example, the grounding feature can be incorporated into the tool by modifying the shaft and making a copper sleeve 102 which slides over the rod between the boot and the torque release means. A lug with a ground lead 104 can then be attached to the copper rod.

When the components of the present tool are assembled as described above, a standard hot stick can be used to engage eye 82 and apply a rotating force to handle 80. This applied torque is transmitted from handle 80 via lug 88 to housing 42. When the torque is less than a preset torque value, ball bearings 64 transmit the applied torque from housing 42 to transmitting member 48. When the applied torque exceeds the preset value, however, it will overcome the biasing force of belleville washers 47, causing transmitting member 48 to shift axially away from end 44 of housing 42 and causing bearings 64 to leave recesses 72, thereby allowing transmitting member 42 to slip. Hence, no torque greater than the preset value can be transmitted. If transmitting member 42 does not slip, the torque is transmitted directly to shaft 10 by hexagonal shaft 22, and from shaft 10 to the rotatable element of an LRTP by hexagonal shaft 14.

The torque at which the tool will release, or slip, may be adjusted by advancing or reversing threaded washer 50, by rotating it relative to housing 42, thereby causing threads 53 to advance or reverse relative to threads 43. Advancing or reversing washer 50 changes the force applied by belleville washers 47 to the backside 73 of flange 70 and the torque at which the tool will release. In the preferred method of use, the torque value at which release occurs is not adjusted frequently and is set at approximately 20 ft-lbs.

It will be understood by one skilled in the art that according to the present invention, an LRTP and separable connector assembly may be steadied, connected, and tightened to a desired torque using a single tool. Further, any axial force which may inadvertently be applied by the user will not affect the torque release mechanism, ensuring that the torque at which the tool releases is actually the torque to which the rotatable element of the LRTP has been tightened. The tool is also useful in disconnecting an separable connector assembly.

While a preferred embodiment of the invention has been shown and described, modifications thereof can be made by one skilled in the art without departing from the spirit of the invention.

What is claimed is:

1. A tool for connecting or disconnecting a separable connector assembly, said assembly having a loadbreak reducing tap plug supported therein, comprising:
   a shaft having a first end adapted for releasable engagement with the plug and a second end having connection means;
   an insulating boot affixed to said shaft for receiving said loadbreak reducing tap plug;
   a torque release means having first and second components that are releasably coupled by a coupling means, but which rotate relatively upon reaching a predetermined torque, said connection means of said second end releasably connecting said second component to said shaft;
   a handle member connected to said first component for transmitting torque to said first component, whereby the torque is transmitted to the plug, while a torque that is greater than the predetermined torque is not transmitted through the components, but causes said first component to release from and rotate relative to said second component.

2. A tool according to claim 1 wherein the tool includes a ground.

3. A tool according to claim 1 wherein said connection means of said second end comprises a portion having a hexagonal cross-section and said second component includes a coaxial hexagonal chamber for engagement with said hexagonal portion.

4. A tool according to claim 1 wherein said second component is affixed to said hexagonal portion by a bolt that engages a coaxial threaded bore within said second shaft.

5. A tool according to claim 1 wherein the handle includes an eye, a base, and a lug affixed to said base and extending from the eye for engagement with said first component.

6. A tool according to claim 5 wherein the eye is adapted for engagement with a hot stick.

7. A tool according to claim 5 wherein the lug includes a square portion and an eccentric portion, the eccentric portion engaging a corresponding eccentric opening in said base and the square portion engaging a corresponding square opening in said first component.

8. A tool according to claim 7, further including means for affixing said lug to said first component.

9. A tool according to claim 8 wherein said affixing means comprises a pin passing through aligned transverse bores in said lug and said first component.

10. A tool according to claim 1, further including means for applying an axial force to said second component, such that said second component bears on said coupling means.

11. A tool according to claim 10 wherein said coupling means comprises a plurality of ball bearings disposed in a plurality of recesses, whereby when a torque that exceeds the preset torque is applied to the handle, said axial force is overcome and said bearing leave their recesses, allowing said first and second components to rotate relative to each other.

* * * * *